US012804497B2

(12) United States Patent
Huang-Fu

(10) Patent No.: US 12,804,497 B2
(45) Date of Patent: *Nov. 17, 2026

(54) SESSION CONTINUITY FOR 3GPP AND NON-3GPP INTERWORKING

(71) Applicant: MEDIATEK INC., Hsin-Chu (TW)

(72) Inventor: Chien-Chun Huang-Fu, Hsin-Chu (TW)

(73) Assignee: MEDIA TEK INC., Hsin-Chu (TW)

( * ) Notice: Subject to any disclaimer, the term of this patent is extended or adjusted under 35 U.S.C. 154(b) by 203 days.

This patent is subject to a terminal disclaimer.

(21) Appl. No.: 18/793,801

(22) Filed: Aug. 3, 2024

(65) Prior Publication Data

US 2024/0397389 A1 Nov. 28, 2024

Related U.S. Application Data

(63) Continuation of application No. 17/719,093, filed on Apr. 12, 2022, now Pat. No. 12,082,065.

(60) Provisional application No. 63/187,960, filed on May 13, 2021.

(51) Int. Cl.

*H04W 36/14* (2009.01)
*H04W 36/00* (2009.01)

(52) U.S. Cl.

CPC ....... *H04W 36/14* (2013.01); *H04W 36/0022* (2013.01); *H04W 36/0033* (2013.01); *H04W 36/13* (2023.05)

(58) Field of Classification Search

CPC ............ H04W 36/14; H04W 36/0022; H04W 36/0033

See application file for complete search history.

(56) References Cited

U.S. PATENT DOCUMENTS

| | | | | |
|---|---|---|---|---|
| 9,277,579 | B1 * | 3/2016 | Zhao | H04W 76/10 |
| 2018/0167854 | A1 * | 6/2018 | Enomoto | H04W 12/062 |
| 2018/0227807 | A1 * | 8/2018 | Youn | H04W 36/0011 |

FOREIGN PATENT DOCUMENTS

| | | | | |
|---|---|---|---|---|
| CN | 110278619 A | | 9/2019 | |
| CN | 112400341 A | | 2/2021 | |
| CN | 112400357 A | | 2/2021 | |
| TW | 202110225 A | | 3/2021 | |
| WO | WO-2012113153 A1 | * | 8/2012 | H04W 76/12 |

OTHER PUBLICATIONS

China Intellectual Property Office Action 202210516847.X, dated Dec. 12, 2024.

(Continued)

*Primary Examiner* — Allahyar Kasraian

(74) *Attorney, Agent, or Firm* — Helen Mao; Imperium Patent Works

(57) ABSTRACT

A method for S-NSSAI handling of a 5GS capable UE supporting session continuity between 3GPP and non-3GPP interworking is proposed. The UE maintains a PDN connection/PDU session. The UE performs interworking among S1 mode, N1 mode (including 3GPP and non-3GPP access), and ePDG. The UE associates the existing S-NSSAI with the new PDN connection/PDU session after interworking, no matter whether the S-NSSAI is provided by the network or not. The UE can update the S-NSSAI upon receipt of new value from the network. When interwork to N1 mode, the UE applies the S-NSSAI.

14 Claims, 4 Drawing Sheets

(56) References Cited

OTHER PUBLICATIONS

3GPP TS 23.502V17.0.0(Mar. 2021).
Taiwan IPO, office action for the Taiwanese patent Application 111117814 (no English translation is available) , dated Nov. 28, 2022 (14 pages).
3GPP, 3GPP TS 23.502 V17.0.0, Technical Specification Group Services and System Aspect; Procedures for the 5G System (5GS; Stage 2 (Release 17), Figures 4.11.1.2.2.2-1, Sections 4.2.2.2.2, 4.3.2.1, 4.3.2.2.1, 4.9.1, 4.9.2.1, 4.9.2.2, 4.11.0, 4.11.0a.5, 4.11.0a.7, 4.11.1.1, 4.11.1.2.1, 4.11.1.2.2, 4.11.1.2.2.1, 4.11.1.3.1, 4.11.1.4..1, 4.11.3.2, 4.11.4, 4.22.4.1, 4.11.4.3, dated Mar. 2021 (640 pages).

* cited by examiner

SESSION CONTINUITY FOR 3GPP AND NON-3GPP INTERWORKING

CROSS REFERENCE TO RELATED APPLICATIONS

This application is a continuation and claims priority under 35 U.S.C. § 120 from nonprovisional U.S. Patent application Ser. No. 17/719,093, entitled "session continuity for 3gpp and non-3gpp interworking", filed on Apr. 12, 2022, the subject matter of which is incorporated herein by reference. Application Ser. No. 17/719,093, in turn, claims priority under 35 U.S.C. § 119 from U.S. Provisional Application No. 63/187,960, entitled "Session continuity for 3GPP/non-3GPP interworking", filed on May 13, 2021, the subject matter of which is incorporated herein by reference.

TECHNICAL FIELD

The disclosed embodiments relate generally to wireless communication, and, more particularly, to method of supporting session continuity between 3GPP and non-3GPP interworking.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The 3rd generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems (5GS).

In 4G evolved packet system (EPS), a Packet Data Network (PDN) connectivity procedure is an important process when LTE communication system accesses to the packet data network. The purpose of PDN connectivity procedure is to setup a default EPS bearer between a UE and the packet data network. In 5G, a Protocol Data Unit (PDU) session establishment is a parallel procedure of the PDN connectivity procedure in 4G. A PDU session defines the association between the UE and the data network that provides a PDU connectivity service. Each PDU session is identified by a PDU session ID (PSI), and may include multiple QoS flows and Qos rules.

Interworking to 5GS is supported for a PDN connection if the corresponding default EPS bearer context includes a PDU session identity (PSI), Single-Network Slice Selection Assistance Information (S-NSSAI), session AMBR and one or more QoS flow descriptions received in the Protocol configuration options IE or Extended protocol configuration options IE, or the default EPS bearer context has association with the PDU session identity, the S-NSSAI, the session-AMBR and one or more QOS flow descriptions after inter-system change from N1 (5GS) mode to S1 (4G, EPS) mode.

Specifically, to ensure the session continuity, an S-NSSAI should be kept associating with the PDN connection which supports interwork with 5GS. An S-NSSAI can be provided to the UE by the ePDG during PDN connection establishment, and the S-NSSAI is used to associate with the PDN connection. The stored S-NSSAI can be included in the PDU session establishment request message when handover from ePDG to N1 mode. An S-NSSAI can also be provided to the UE by the MME during PDN connection establishment in both with N26 and without N26 scenarios. The stored S-NSSAI is used, without N26 scenario, to be included in the PDU session establishment request when handover from S1 mode to N1 mode. However, the S-NSSAI maintenance and handling for session continuity is not clear when handover from S1 mode to ePDG, handover from ePDG to S1 mode, handover from N1 mode to ePDG, and handover from N1 mode to S1 mode.

SUMMARY

A method for S-NSSAI handling of a 5GS capable UE supporting session continuity between 3GPP and non-3GPP interworking is proposed. The UE maintains a PDN connection/PDU session. The UE performs interworking among S1 mode, N1 mode (including 3GPP and non-3GPP access), and ePDG. The UE associates the existing S-NSSAI with the new PDN connection/PDU session after interworking, no matter whether the S-NSSAI is provided by the network or not. The UE can update the S-NSSAI upon receipt of new value from the network. When interwork to N1 mode, the UE applies the associated S-NSSAI.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
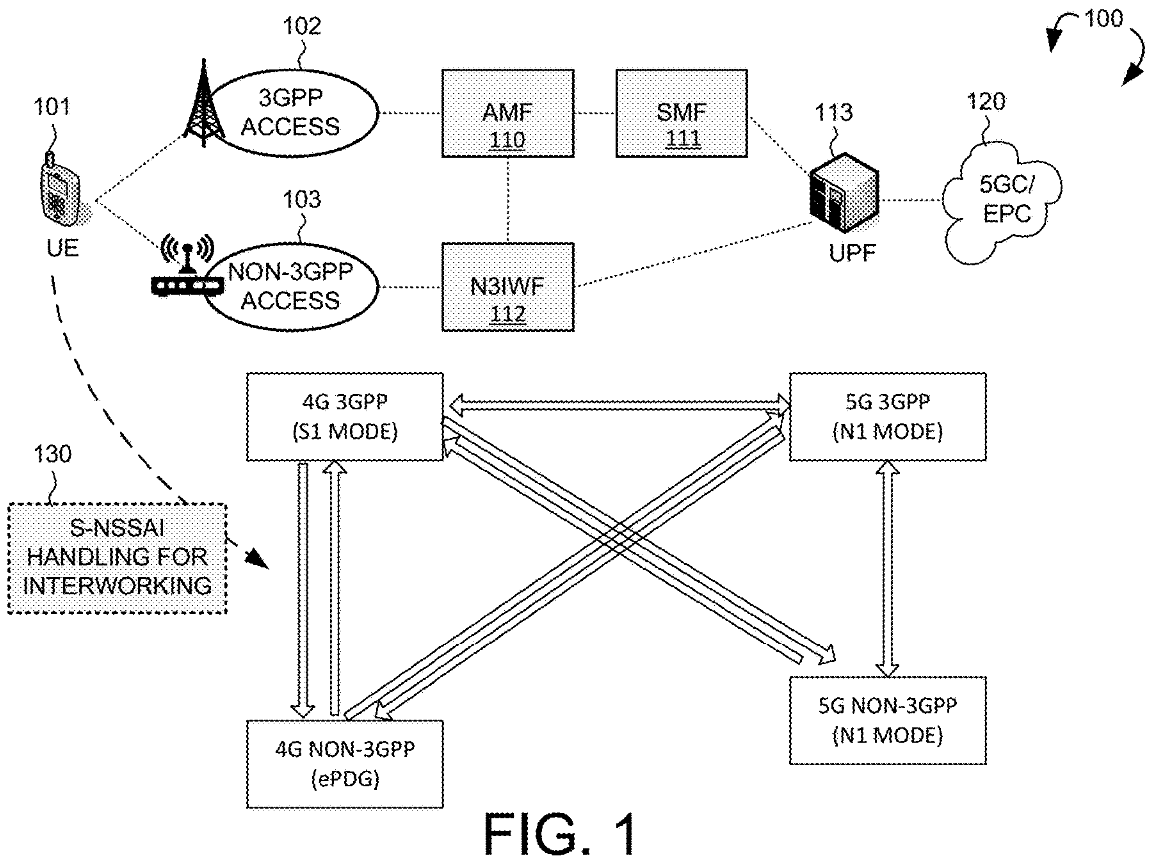
FIG. 1 illustrates an exemplary 5G/4G network and a Packet Data Network (PDN) connection supporting inter-system change and session interworking with 5GS in accordance with one novel aspect.

FIG. 1 illustrates an exemplary 5G/4G network 100 and a Packet Data Network (PDN) connection supporting inter-system change and session interworking with 5GS in accordance with one novel aspect. 5G new radio (NR) network 100 includes a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, an Non-3GPP interworking function (N3IWF) 112, a user plane function (UPF) 113, and a 5G core (5GC) or an evolved packet core (EPC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating and removing PDU sessions and managing session context with the UPF 113. The N3IWF 112 interfaces to 5GC/EPC network control plane functions, responsible for routing messages outside 3GPP RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can be used on the PDN) is assigned to the UE for its connection to the PDN. In 4G, a PDN connectivity procedure is to setup a Default EPS Bearer between a UE and the packet data network. EPS has defined the Default EPS Bearer to provide the IP Connectivity that is Always-On. In 5G, a Protocol Data Unit (PDU) session establishment procedure is a parallel procedure of a PDN connectivity procedure in 4G. A PDU session defines the association between the UE and the data network that provides a PDU connectivity service. Each PDU session is identified by a PDU session ID, and can be established over a 3GPP RAN, and/or over a non-3GPP RAN for radio access. 5G session management (5GSM) for PDU sessions over both 3GPP access and non-3GPP access are managed by AMF and SMF via NAS signaling. In 5G, a multi-access (MA) PDU session uses one 3GPP access network or one non-3GPP access network at a time, or simultaneously one 3GPP access network and one non-3GPP access network.

As depicted in FIG. 1, interworking is supported for PDU sessions and PDN connections, e.g., inter-system change between 5G 3GPP (N1 mode), 5G non-3GPP (N1 mode), 4G 3GPP (S1 mode), and 4G non-3GPP (ePDG). Specifically, to ensure the session continuity, an Single-Network Slice Selection Assistance Information (S-NSSAI) should be kept associating with the PDN connection which supports interworking with 5GS. An S-NSSAI can be provided to the UE by an evolved packet data gateway (ePDG) during PDN connection establishment, and the S-NSSAI is used to associate with the PDN connection. The stored S-NSSAI can be included in the PDU session establishment request message when handover from ePDG to N1 mode. An S-NSSAI can also be provided to the UE by the MME during PDN connection establishment in both with N26 and without N26 scenarios. The stored S-NSSAI is used, without N26 scenario, to be included in the PDU session establishment request when handover from S1 mode to N1 mode. However, the S-NSSAI maintenance and handling for session continuity is not clear when handover from S1 mode to ePDG, handover from ePDG to S1 mode, handover from N1 mode to ePDG, and handover from N1 mode to S1 mode.

Accordingly, a method for S-NSSAI handling of a 5GS capable UE supporting session continuity between 3GPP and non-3GPP interworking is proposed (130). The UE maintains a PDN connection/PDU session. The UE performs interworking among S1 mode, N1 mode (including 3GPP and non-3GPP access), and ePDG. The UE associates the existing S-NSSAI with the new PDN connection/PDU session after interworking, no matter whether the S-NSSAI is provided by the network or not. The UE can update the S-NSSAI upon receipt of new value from the network. When interwork to N1 mode, the UE applies the S-NSSAI, which ensures session continuity upon inter-system change. The S-NSSAI is a mandatory parameter associated with a PDU session which should be in the allowed NSSAI list provided by the network. If the S-NSSAI associated with the PDU session is not in the allowed NSSAI list, the UE should locally release the corresponding PDU session. By applying the same principle, if the PDU session has no S-NSSAI association, the PDU session will be locally release by the UE.

Figure 2:
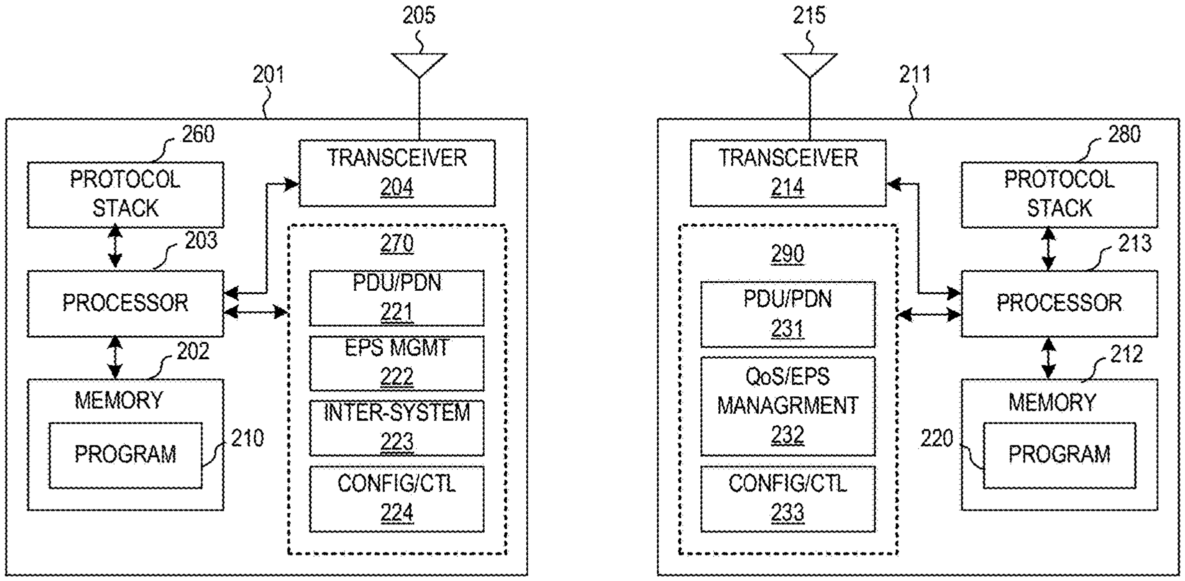
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. QoS and EPS bearer management circuit 232 creates, modifies, and deletes QoS and EPS bearers for UE. Configuration and control circuit 233 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, an EPS bearer management circuit 222 that manages, creates, modifies, and deletes mapped EPS bearer contexts and mapped 5GSM parameters, an inter-system handling circuit 223 that handles inter-system change functionalities, and a config and control circuit 224 that handles configuration and control parameters for mobility management and session management.

Figure 3:
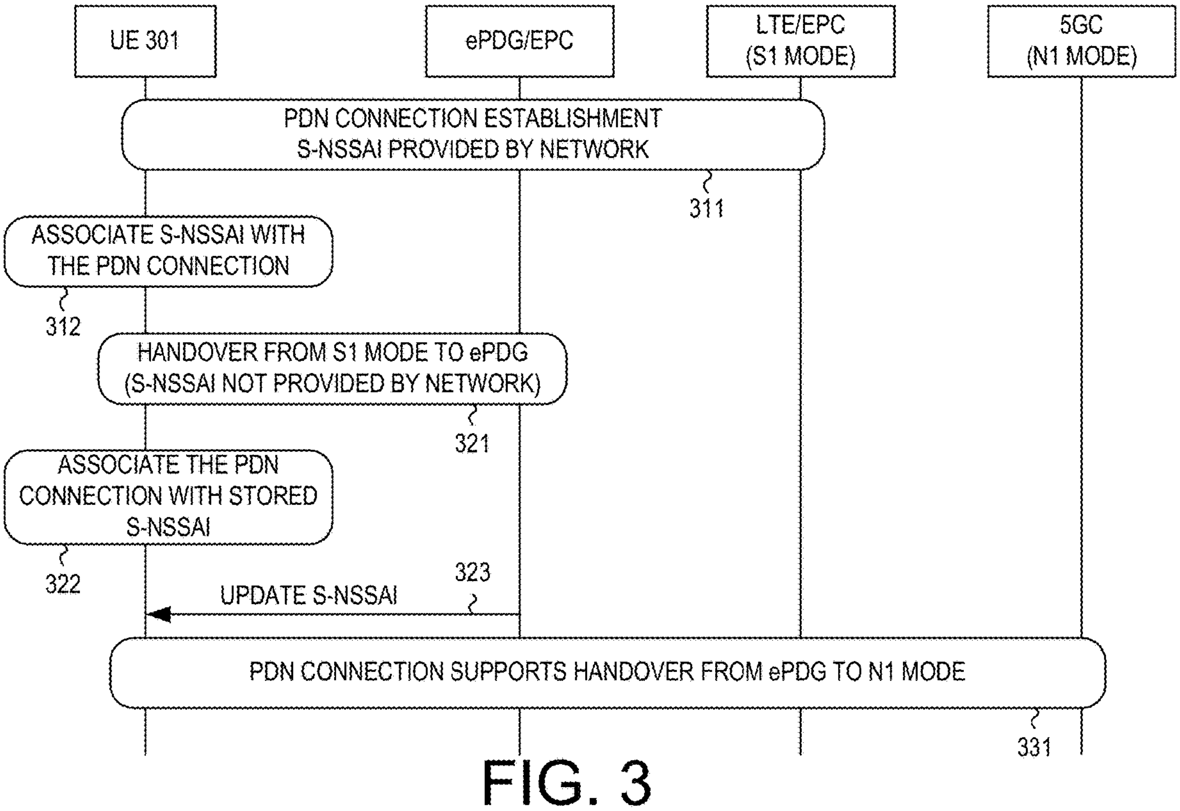
FIG. 3 illustrates a first embodiment of a PDN connection supports session continuity upon handover from ePDG to N1 mode and corresponding S-NSSAI handling.

FIG. 3 illustrates a first embodiment of a PDN connection supports session continuity upon handover from ePDG to N1 mode and corresponding S-NSSAI handling. In step 311, UE 301 establishes a PDN connection over 3GPP access (S1 mode) in EPC. An S-NSSAI is provided by the network (e.g., the MME), which is to be associated with the established PDN connection. In step 312, UE 301 associates the S-NSSAI with the PDN connection and stores the S-NSSAI. In step 321, UE 301 performs a handover procedure from the existing PDN connection in S1 mode (3GPP access) to a new PDN connection in ePDG (non-3GPP access). The network (e.g., the ePDG) may not provide S-NSSAI for the new PDN connection. In step 322, UE 301 associates the previous stored S-NSSAI to the new PDN connection, regardless of whether any S-NSSAI is provided by the network (e.g., the ePDG) or not.

Later on, in step 323, the ePDG may update the associated S-NSSAI by providing an updated value for S-NSSAI. For example, the network provides the UE with an S-NSSAI in the N1 MODE INFORMATION Notify payload in the IKE AUTH response message. The UE shall delete the stored S-NSSAI, and shall store the S-NSSAI provided by the network. In step 331, the new PDN connection in ePDG supports handover from ePDG to N1 mode with session continuity. When handover from ePDG to N1 mode, the associated S-NSSAI is sent with the PDU session establishment request message, no matter whether the S-NSSAI is provided by the network or not. Note that the UE shall not request to perform handover of an existing PDN connection from ePDG to N1 mode if the associated S-NSSAI is not included in the allowed NSSAI for the target access.

Figure 4:
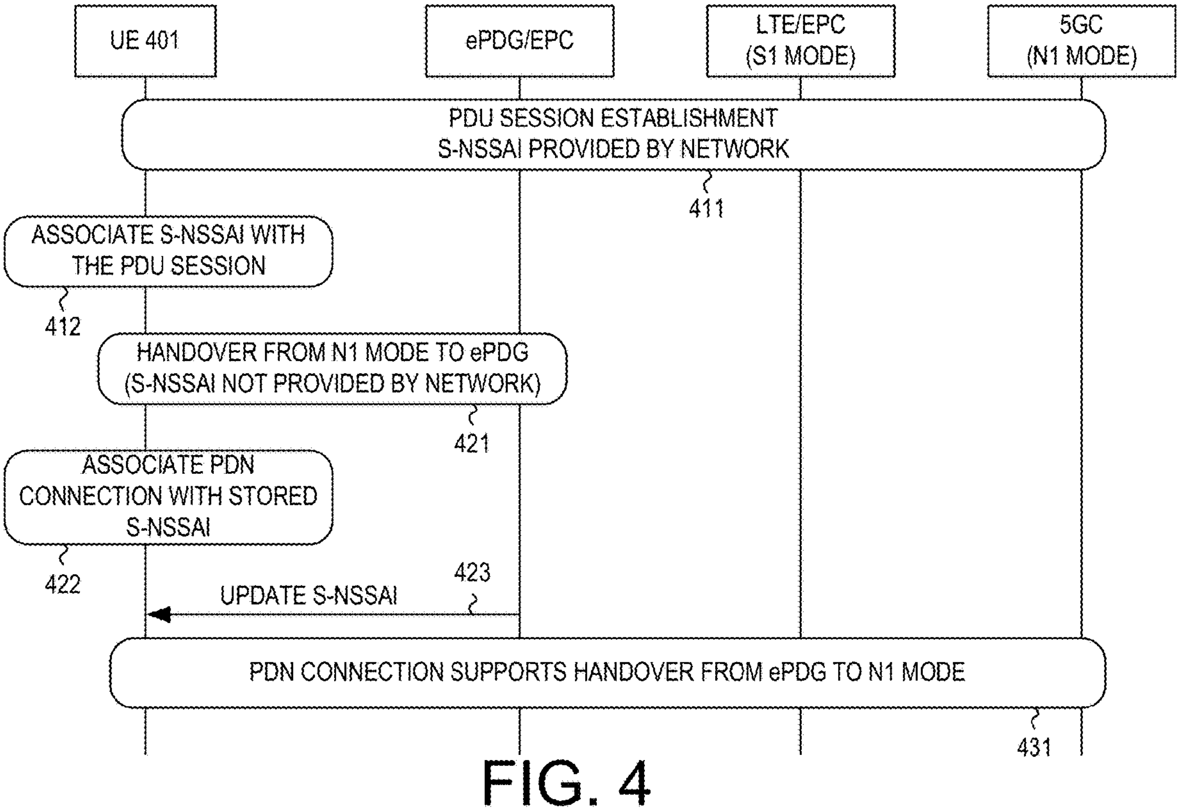
FIG. 4 illustrates a second embodiment of a PDN connection supports session continuity upon handover from ePDG to N1 mode and corresponding S-NSSAI handling.

FIG. 4 illustrates a second embodiment of a PDN connection supports session continuity upon handover from ePDG to N1 mode and corresponding S-NSSAI handling. In step 411, UE 401 establishes a PDU session over 3GPP access (N1 mode) in 5GC. An S-NSSAI is provided by the network (e.g., the SMF/AMF), which is to be associated with the established PDU session. In step 412, UE 401 associates the S-NSSAI with the PDU session and stores the S-NSSAI. In step 421, UE 401 performs a handover procedure from the existing PDU session in N1 mode (over 3GPP access) to a new PDN connection in ePDG (non-3GPP access). The network (e.g., the ePDG) may not provide S-NSSAI for the new PDN connection. In step 422, UE 401 associates the previous stored S-NSSAI to the new PDN connection, regardless of whether any S-NSSAI is provided by the network (e.g., the ePDG) or not.

Later on, in step 423, the ePDG may update the S-NSSAI by providing an updated value for S-NSSAI. For example, the network provides the UE with an S-NSSAI in the N1 MODE INFORMATION Notify payload in the IKE AUTH response message. The UE shall delete the stored S-NSSAI, and shall store the S-NSSAI provided by the network. In step 431, the new PDN connection in ePDG supports handover from ePDG to N1 mode with session continuity. When handover from ePDG to N1 mode, the associated S-NSSAI is sent with the PDU session establishment request message, no matter whether the S-NSSAI is provided by the network or not. Note that the UE shall not request to perform handover of an existing PDN connection from ePDG to N1 mode if the associated S-NSSAI is not included in the allowed NSSAI for the target access.

Figure 5:
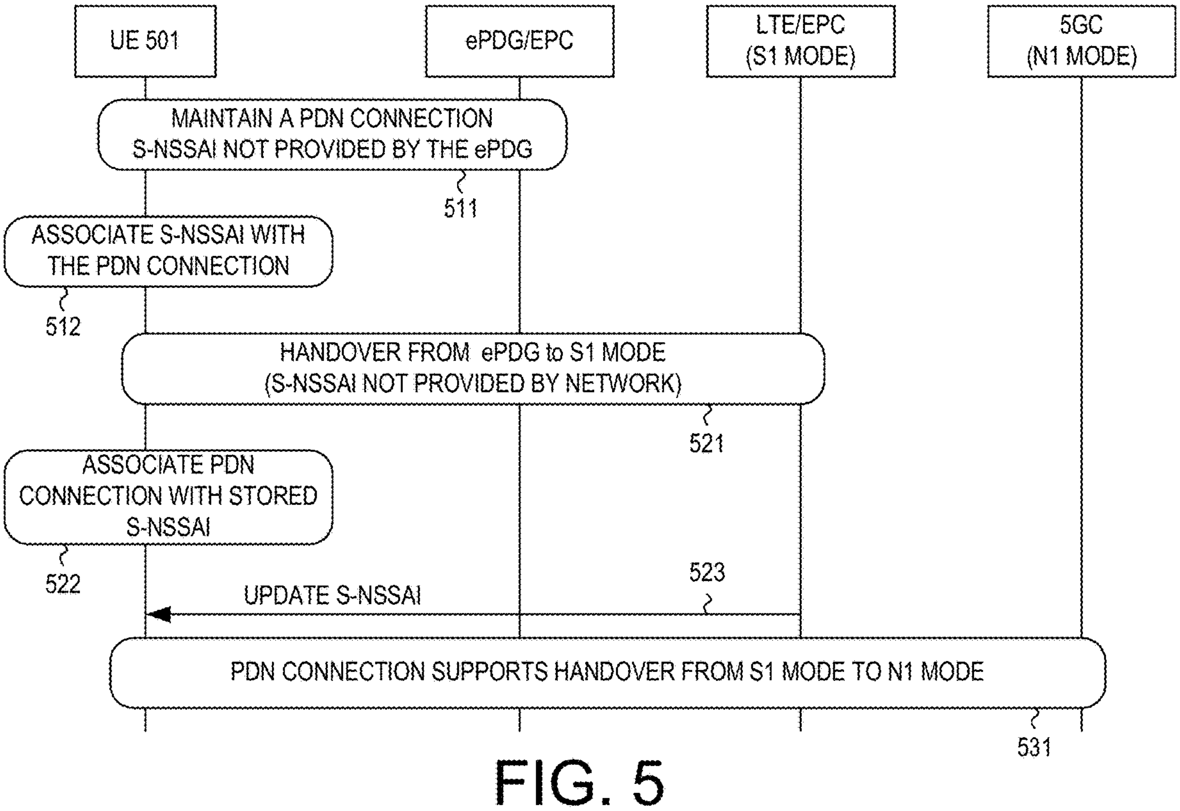
FIG. 5 illustrates a first embodiment of a PDN connection supports session continuity upon handover from S1 mode to N1 mode and corresponding S-NSSAI handling.

FIG. 5 illustrates a first embodiment of a PDN connection supports session continuity upon handover from S1 mode to N1 mode and corresponding S-NSSAI handling. In step 511, UE 501 maintains a PDN connection over non-3GPP access (ePDG) in EPC. For example, the PDN connection is handover to ePDG from S1 mode or N1 mode, and S-NSSAI is not provided by the network (e.g., the ePDG). In step 512, UE 501 associates the S-NSSAI (from the previous PDN connection or PDU session) with the PDN connection and stores the S-NSSAI. In step 521, UE 501 performs a handover procedure from the existing PDN connection in ePDG (non-3GPP access) to a new PDN connection in S1 mode (3GPP access). The network (e.g., the MME) may not provide S-NSSAI for the new PDN connection. In step 522, UE 501 associates the previous stored S-NSSAI to the new PDN connection, regardless of whether any S-NSSAI is provided by the network (e.g., the MME) or not.

Later on, in step 523, the MME may update the associated S-NSSAI by providing an updated value for S-NSSAI. For example, the network provides the UE with an S-NSSAI in the Protocol configuration options IE or Extended protocol configuration options IE of the ACTIVATE DEFAULT EPS BEARER REQUEST message, the UE shall delete the stored S-NSSAI, and shall store the S-NSSAI provided in the ACTIVATE DEFAULT EPS BEARER CONTEXT REQUEST message. In step 531, the new PDN connection in S1 mode supports handover from S1 mode to N1 mode with session continuity. When handover from S1 mode to N1 mode, the associated S-NSSAI is sent with the PDU session establishment request message, no matter whether the S-NSSAI is provided by the network or not. Note that the UE shall not request to perform handover of an existing PDN connection from S1 mode to N1 mode if the associated S-NSSAI is not included in the allowed NSSAI for the target access.

Figure 6:
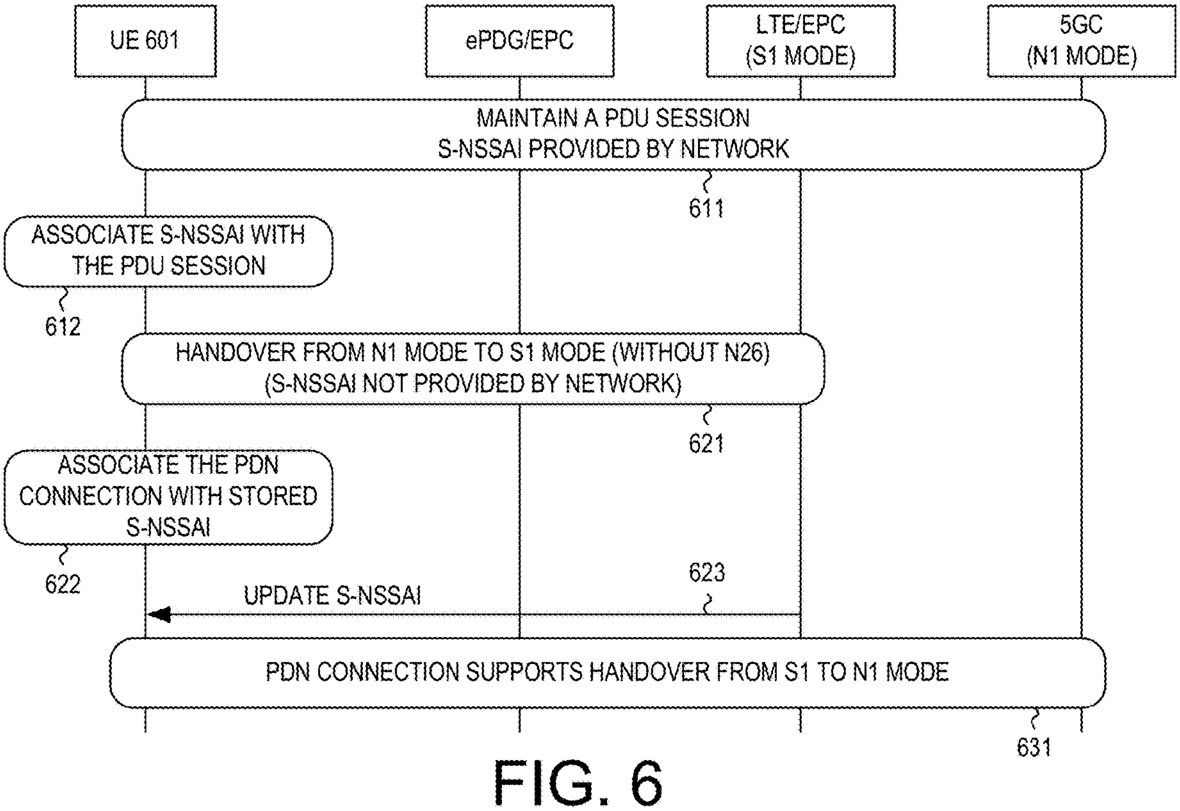
FIG. 6 illustrates a second embodiment of a PDN connection supports session continuity upon handover from S1 mode to N1 mode and corresponding S-NSSAI handling.

FIG. 6 illustrates a second embodiment of a PDN connection supports session continuity upon handover from S1 mode to N1 mode and corresponding S-NSSAI handling. In step 611, UE 601 maintains or establishes a PDU session over 3GPP access (N1 mode) in 5GC. An S-NSSAI is provided by the network (e.g., the SMF/AMF), which is to be associated with the PDU session. In step 612, UE 601 associates the S-NSSAI with the PDU session and stores the S-NSSAI. In step 621, UE 601 performs a handover procedure from the existing PDU session in N1 mode (3GPP access) to a new PDN connection in S1 mode (3GPP access), without N26. When the network does not support N26 interface, the SMF does not provide the UE with the mapped EPS bearer context (which includes S-NSSAI) for a PDU session. Further, the network (e.g., the MME) may or may not provide S-NSSAI for the new PDN connection. In step 622, UE 601 associates the previous stored S-NSSAI to the new PDN connection, regardless of whether any S-NSSAI is provided by the network (e.g., the MME) or not.

Later on, in step 623, the MME may update the S-NSSAI by providing an updated value for S-NSSAI. For example, the network provides the UE with an S-NSSAI in the Protocol configuration options IE or Extended protocol configuration options IE of the ACTIVATE DEFAULT EPS BEARER REQUEST message, the UE shall delete the stored S-NSSAI, and shall store the S-NSSAI provided in the ACTIVATE DEFAULT EPS BEARER CONTEXT REQUEST message. In step 631, the new PDN connection in S1 mode supports handover from S1 mode to N1 mode with session continuity. When handover from S1 mode to N1 mode, the associated S-NSSAI is sent with the PDU session establishment request message, no matter whether the S-NSSAI is provided by the network or not. Note that the UE shall not request to perform handover of an existing PDN connection from S1 mode to N1 mode if the associated S-NSSAI is not included in the allowed NSSAI for the target access.

Figure 7:
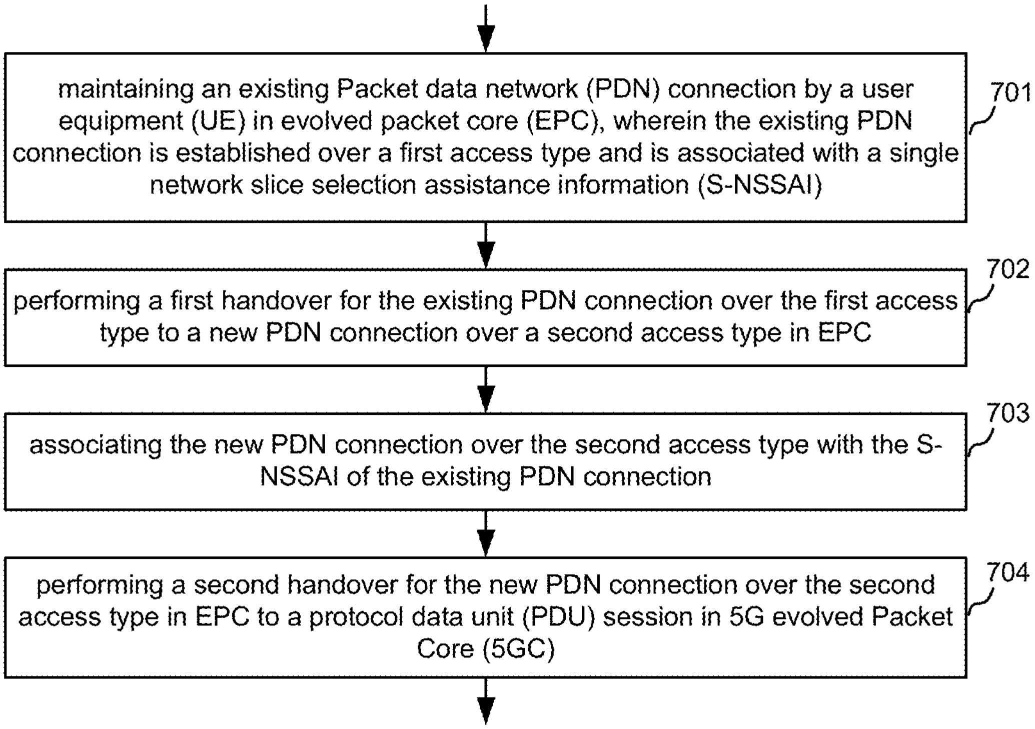
FIG. 7 is a flow chart of a method of supporting session continuity for a PDN connection when handover between ePDG and S1 mode in accordance with one novel aspect of the present invention.

FIG. 7 is a flow chart of a method of supporting session continuity for a PDN connection when handover between ePDG and S1 mode in accordance with one novel aspect of the present invention.

Figure 8:
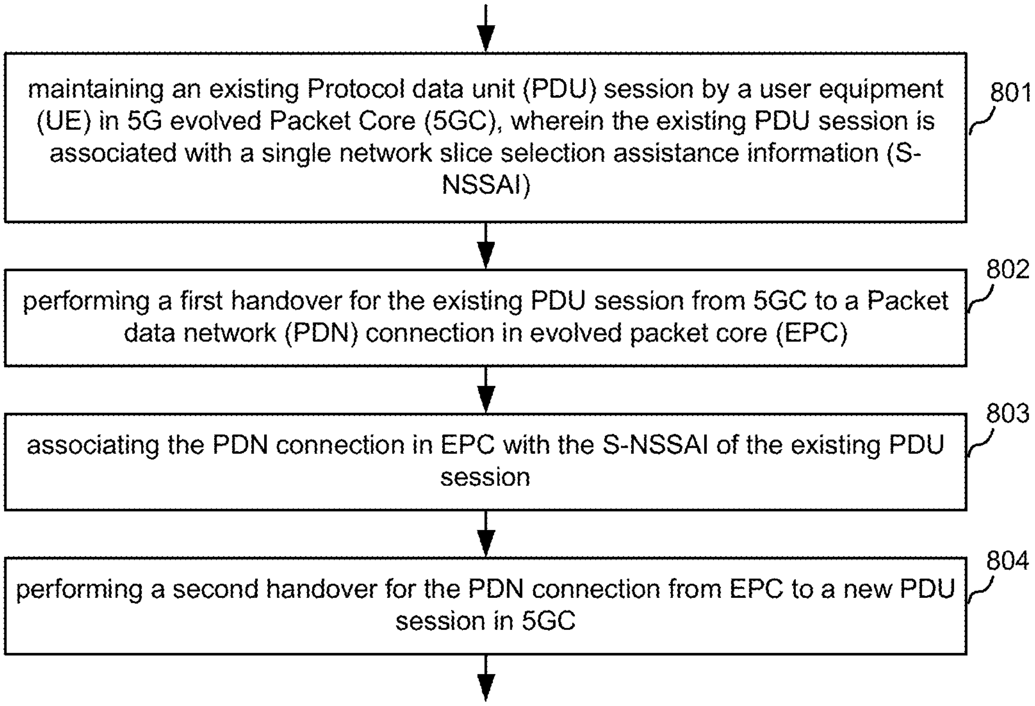
FIG. 8 is a flow chart of a method of supporting session continuity for a PDN connection when handover from N1 mode to ePDG or S1 mode in accordance with one novel aspect of the present invention.

FIG. 8 is a flow chart of a method of supporting session continuity for a PDN connection when handover from N1 mode to ePDG or S1 mode in accordance with one novel aspect of the present invention.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

maintaining an existing Packet data network (PDN) connection by a user equipment (UE) in evolved packet core (EPC), wherein the existing PDN connection is established over a first access type and is associated with a single network slice selection assistance information (S-NSSAI);

performing a first handover for the existing PDN connection over the first access type to a new PDN connection over a second access type in EPC;

associating the new PDN connection over the second access type with the S-NSSAI of the existing PDN connection.

2. The method of claim 1, wherein the first access type is non-3GPP access type, and wherein the second access type is 3GPP access type.

3. The method of claim 1, wherein the first access type is 3GPP access type, and the second access type is non-3GPP access type.

4. The method of claim 1, wherein the UE associated the S-NSSAI to the new PDN connection when an evolved Packet Data Gateway (ePDG) in EPC does not provide any S-NSSAI to the new PDN connection.

5. The method of claim 1, wherein the S-NSSAI of the new PDN connection is updated by an evolved Packet Data Gateway (ePDG) in EPC.

6. The method of claim 1, wherein the UE applies the associated S-NSSAI when performing a second handover to N1 mode in 5GC.

7. The method of claim 1, wherein the UE does not perform a second handover if the S-NSSAI is not included in an allowed NSSAI list of a target access in 5GC.

8. A User Equipment (UE), comprising:

a connection handling circuit that maintains an existing Packet data network (PDN) connection in evolved packet core (EPC), wherein the existing PDN connection is established over a first access type and is associated with a single network slice selection assistance information (S-NSSAI);

an intersystem handling circuit that performs a first handover for the existing PDN connection over the first access type to a new PDN connection over a second access type in EPC; and a controller that associates the new PDN connection over the second access type with the S-NSSAI of the existing PDN connection.

9. The UE of claim 8, wherein the first access type is non-3GPP access type, and wherein the second access type is 3GPP access type.

10. The UE of claim 8, wherein the first access type is 3GPP access type, and the second access type is non-3GPP access type.

11. The UE of claim 8, wherein the UE associated the S-NSSAI to the new PDN connection when an evolved Packet Data Gateway (ePDG) in EPC does not provide any S-NSSAI to the new PDN connection.

12. The UE of claim 8, wherein the S-NSSAI of the new PDN connection is updated by an evolved Packet Data Gateway (ePDG) in EPC.

13. The UE of claim 8, wherein the UE applies the associated S-NSSAI when performing a second handover to N1 mode in 5GC.

14. The method of claim 8, wherein the UE does not perform a second handover if the S-NSSAI is not included in an allowed NSSAI list of a target access in 5GC.

* * * * *